Jan. 21, 1941.  F. G. THANNHAUSER  2,229,352
CAR JACKING DEVICE
Filed July 8, 1939
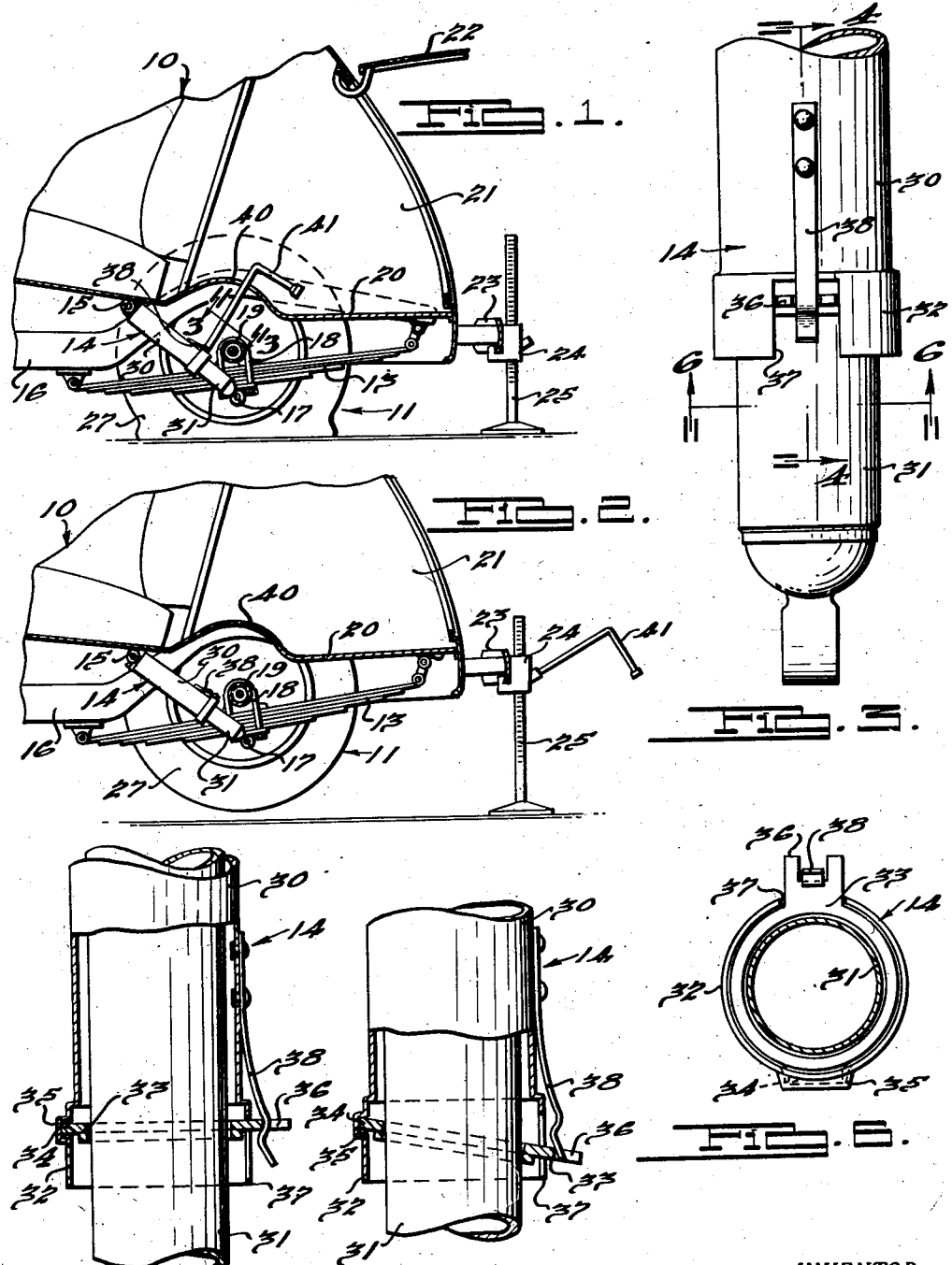
INVENTOR
FRED G. THANNHAUSER.
BY
ATTORNEYS.

Patented Jan. 21, 1941

2,229,352

UNITED STATES PATENT OFFICE 2,229,352

CAR JACKING DEVICE

Fred G. Thannhauser, Detroit, Mich., assignor to Chrysler Corporation, Highland Park, Mich., a corporation of Delaware Application July 8, 1939, Serial No. 283,422

6 Claims. (Cl. 267—8)

The present invention relates to automobile or other road vehicle construction, specifically comprising means whereby a sprung portion of the automobile may be latched to an unsprung portion thereof in order that the two portions may be lifted in unison when force is applied to the sprung portion. The present invention is particularly useful in connection with the modern makes of automobiles wherein the axle portion of the automobile is so located relative to other parts of the automobile as to be practically inaccessible, especially when a tire is deflated thereby causing the axle to be closer to the ground than usual.

The object of the present invention is to render it possible to lift a wheel and tire assembly from the ground by means of a jack or lifting device applied to the protruding bumper or other accessible part of the sprung portion of an automobile, without first raising the sprung portion to the limit of flexibility of the springing means and thereafter lifting the unsprung portion through the tensional strength of the springing means. The present invention therefore serves several purposes, one of the principal purposes being to enable the replacement of a wheel by the use of ordinary instead of special equipment, and a second important advantage being the protection of the springing means, which might otherwise be permanently distorted or otherwise damaged by the use of such ordinary lifting means.

The present invention comprises the provision of a simply manufactured and easily assembled part to a substantially ordinary shock absorber having a tubular part pivotally attached to a portion of the frame of the automobile and a telescoping tubular part pivotally attached to a portion of the unsprung portion of the vehicle, such shock absorber being standard equipment on many types of cars. An object of the present invention is to provide means of the character heretofore described which may be easily operated and is difficult to damage or accidentally displace.

A further object of the present invention is to provide means whereby the relatively movable tubular parts of a shock absorber of the character previously described may be latched against relative axial movement in order to achieve the advantages heretofore described, such means being readily accessible and easily operated by a standard tool normally supplied with vehicles of the type in question.

Other objects and advantages of the present invention should be apparent from a study of the following specification taken in connection with the accompanying drawing wherein like numerals refer to like parts throughout.

In the drawing,

Fig. 1 discloses a device of the present invention applied to the rear axle assembly of a modern automobile, a tire of which is deflated, showing the lifting device or jack in position at the rear bumper of the automobile and showing how the jack handle or a wheel tool may be used to operate the device of the present invention;

Fig. 2 is a view similar to Fig. 1, showing the tire raised from the ground by operation of the jacking device;

Fig. 3 is a partial detail view of the present invention taken substantially from the plane indicated by the line 3—3 in Fig. 1;

Fig. 4 is a partial detail view having a part of the present invention removed substantially along the line 4—4 of Fig. 3 in order to show the latching means of the present invention in inoperative position or the position permitting normal operation of the shock absorber;

Fig. 5 is a partial view similar to Fig. 4 showing the latching means of the present invention in operation; and, Fig. 6 is a cross-section through the device of the present invention taken substantially along line 6—6 of Fig. 3 and looking in the direction of the arrows.

The present invention is designed to be applied to a modern vehicle having a sprung portion 10 attached to an unsprung portion 11 by means of a springing device 13 of usual character. The sprung and unsprung portions of the automobile have associated therewith a shock absorbing device 14 of substantially standard type comprising a part pivotally attached at 15 to a portion of the sprung portion 10, such as the main frame 16, and a part pivotally attached at 17 to a portion of the unsprung portion of the automobile, such as the shackle 18 by which the spring assembly 13 is held in assembled relation with respect to the axle 19. Ordinary operation of the vehicle over uneven road surfaces results in rapid movements of the unsprung portions, which movements would ordinarily result in rapid vertical movements of the sprung portion 10 were it not for the cushioning effect of the spring 13 and shock absorbing device 14 which normally permits relatively unimpeded, separating movements of the sprung and unsprung portions but impedes movements of the sprung and unsprung portions toward each other, thereby causing the sprung portion to progress more nearly in a straight line.

The present disclosure shows the present invention applied to the rear portion of the automobile, but of course it is to be appreciated that in some makes of automobiles the present invention could be applied to the front portion, or to both the front and the rear portion. In the present disclosure the shock absorbing device 14 occupies a position such that it extends beneath a portion of the floor 20 of the rear compartment 21 which is provided with an access door 22, and the rear portion is shown as provided with a rearwardly protruding bumper 23 which may be engaged by the lifting bracket 24 of a standard jacking device 25. Fig. 1 discloses the relative positions of the various parts of the automobile and the present invention if a rear tire 27 should become deflated thereby causing the bottom portion of the shackle 18, at which force should be applied when lifting the automobile, so closely to approach the ground as to require the provision of expensive and complicated lifting mechanism which ordinarily is not available to the operator of the vehicle during the emergency of repairing or replacing a tire. Therefore, the present invention comprises means which will hereafter be described in detail for latching or tying the sprung to the unsprung portions in order that they may be lifted in unison as shown in Fig. 2 by operation of a conventional jacking device 25 applied to the bumper 23.

The means for accomplishing the objects of the present invention comprises the provision of the shock absorbing device 14 having a rigid cylinder 30 which is pivotally attached at 15 to the frame 16, and a rigid plunger 31 which is attached at 17 to the spring assembly. The cylinder 30 is provided with a skirt portion 32 of slightly increased internal diameter in order that a locking ring 33 may be accommodated within the annular space between the outer surface of the member 31 and the inner surface of the skirt 32. The ring 33 may be pivotally held in position as by means of an extension 34 at one side which fits into a socket 35 provided by extruding a portion of the side wall of the skirt 32. The ring 33 is normally retained in a position such as to occupy a plane substantially normal to the longitudinal axes of the telescoping members 30 and 31, and the internal diameter of the ring 33 is sufficiently greater than the external diameter of the plunger 31 so as not to interfere with normal shock absorbing movement thereof.

The ring 33 is provided with an extending tongue 36 which extends through a slot 37 cut into the side of the skirt 32 at a point diametrically opposed to the extrusion 35, the depth of the slot 37 being such as to extend to the same distance from the lower edge of the skirt 32 as the distance from said lower edge to the top of the extrusion 35 so that the ring 33 may be held in its normally inoperative position by restraining means comprising a spring clip 38 attached to the surface of the cylinder 30 and provided with a curved tip portion adapted to snap over a part of the tongue 36.

In Figs. 1 and 2 it is seen that the floor 20 of the rear compartment 21 may be provided with a conveniently located opening 40 through which the handle 41 of the jacking device 25, or other convenient rod-like tool, may be inserted in order to force the tongue portion 36 of the ring 33 from the grip of the restraining means 38 in order that the ring may drop to a cocked position with respect to the longitudinal axes of the tubular members. In such a position the surface of the plunger 31 is frictionally engaged at substantially diametrically opposed portions by the sharp inner corners of the ring 33. Movement of the sprung portions toward the unsprung portions of the vehicle would thereafter be permitted since such movement would cause the ring 33 to tend to return to its inoperative position thereby permitting a relative longitudinal movement of the tubular members; but movement of the sprung portion relatively away from the unsprung portion would be prevented due to the grip of the latching device on the plunger and the pivotal attachment of the latching device to the cylinder. The jacking device 25 may be operated to lift a quarter portion of the automobile from the ground without having the result of causing separation of the sprung and unsprung portions to the straining or breaking point of the spring assembly 13. After the tire has been repaired or replaced, or after any other desired operation has been performed, the jacking device may be lowered to cause the vehicle to again rest upon four tires as usual, whereupon the tool or handle 41 may be reinserted through the opening 40 and used to force the tongue 36 of ring 33 into the grip of the restraining means 38.

Having described a preferred embodiment of my invention it should be apparent to those skilled in the art that the same may assume numerous modifications in arrangement and detail. All such modifications as come within the scope of the following claims are considered a part of my invention.

I claim:

1. In an automobile, the provision of means for tying a sprung portion of the automobile to an unsprung portion thereof in order that said sprung and unsprung portions may remain in relative position when lifted from the ground by the application of force to said sprung portion, comprising a shock absorber having an elongated rigid member attached to said sprung portion and a second elongated, rigid member attached to said unsprung portion, said members being longitudinally movable with respect to each other during normal operation of the shock absorber, and means for latching said members against longitudinal movement away from each other.

2. In an automobile, the provision of means for tying a sprung portion of the automobile to an unsprung portion thereof in order that said sprung and unsprung portions may remain in relative position when lifted from the ground by the application of force to said sprung portion, comprising a shock absorber having a tubular member attached to said sprung portion and a rigid member attached to said unsprung portion and extending into said tubular member, said members being relatively movable in an axial direction during normal operation of the shock absorber, and means for latching said members against relative axial movement away from each other.

3. In an automobile, the provision of means for tying a sprung portion of the automobile to an unsprung portion thereof in order that said sprung and unsprung portions may remain in relative position when lifted from the ground by the application of force to said sprung portion, comprising a shock absorber having a hollow cylindrical member attached to said sprung portion and a second cylindrical member attached to said unsprung portion and extending longitudinally into said hollow, cylindrical member, said members being coaxially movable relative to each other during normal operation of the shock absorber, and means for latching said members against relative movement away from each other.

4. In an automobile, the provision of means for tying a sprung portion of the automobile to an unsprung portion thereof in order that said sprung and unsprung portions may remain in relative position when lifted from the ground by the application of force to said sprung portion, comprising a shock absorber having a hollow cylindrical member pivotally attached to said sprung portion and a second cylindrical member pivotally attached to said unsprung portion and extending longitudinally into said hollow, cylindrical member, said members being coaxially movable relative to each other during normal operation of the shock absorber, and means for latching said members against relative movement away from each other.

5. In an automobile, the provision of means for tying a sprung portion of the automobile to an unsprung portion thereof in order that said sprung and unsprung portions may remain in relative position when lifted from the ground by the application of force to said sprung portion, comprising a shock absorber having a hollow cylindrical member pivotally attached to said sprung portion and a second cylindrical member pivotally attached to said unsprung portion and extending longitudinally into said hollow, cylindrical member, said members being coaxially movable relative to each other during normal operation of the shock absorber, and means for latching said members against relative movement away from each other comprising a ring pivotally mounted on said hollow, cylindrical member and through which said second cylindrical member extends, said ring having an internal diameter slightly greater than the external diameter of said second cylindrical member so that relative movement of said members is permitted when said ring occupies a position in a plane substantially normal to the longitudinal axes of said members.

6. In an automobile, the provision of means for tying a sprung portion of the automobile to an unsprung portion thereof in order that said sprung and unsprung portions may remain in relative position when lifted from the ground by the application of force to said sprung portion, comprising a shock absorber having a hollow cylindrical member pivotally attached to said sprung portion and a second cylindrical member pivotally attached to said unsprung portion and extending longitudinally into said hollow, cylindrical member, said members being coaxially movable relative to each other during normal operation of the shock absorber, and means for latching said members against relative movement away from each other comprising a ring pivotally mounted on said hollow, cylindrical member and through which said second cylindrical member extends, said ring having an internal diameter slightly greater than the external diameter of said second cylindrical member so that relative movement of said members is permitted when said ring occupies a position in a plane substantially normal to the longitudinal axes of said members, and means normally constraining said ring to occupy such a position in a plane normal to the axes of said members, said constraining means being movable to release said ring whereby to permit pivotal movement of said ring into a cocked position whereby to latch said members against relative separating movement by frictional engagement of diametrically opposed portions of the inner surface of said ring with the outer surface of said second cylindrical member.

FRED G. THANNHAUSER.